(12) United States Patent
Kawashima et al.

(10) Patent No.: US 8,477,409 B2
(45) Date of Patent: Jul. 2, 2013

(54) PLC-TYPE DELAY DEMODULATION CIRCUIT AND PLC-TYPE OPTICAL INTERFEROMETER

(75) Inventors: Hiroshi Kawashima, Tokyo (JP); Kazutaka Nara, Tokyo (JP); Kohei Shibata, Kanagawa (JP)

(73) Assignees: Furakawa Electric Co., Ltd., Tokyo (JP); Fujitsu Optical Components Limited, Kawasaki-shi (JP)

( * ) Notice: Subject to any disclaimer, the term of this patent is extended or adjusted under 35 U.S.C. 154(b) by 0 days.

(21) Appl. No.: 13/614,692

(22) Filed: Sep. 13, 2012

(65) Prior Publication Data

US 2013/0010350 A1 Jan. 10, 2013

Related U.S. Application Data

(63) Continuation of application No. PCT/JP2011/061296, filed on May 17, 2011.

(30) Foreign Application Priority Data

May 31, 2010 (JP) ................................. 2010-124251

(51) Int. Cl.
*G02F 2/00* (2006.01)
*G02F 1/035* (2006.01)
(52) U.S. Cl.
USPC ...................... 359/325; 385/8; 385/9; 385/14
(58) Field of Classification Search
USPC .................... 385/1–9, 14, 129–132; 359/237, 359/325; 398/205, 214; 375/324, 350
See application file for complete search history.

(56) References Cited

U.S. PATENT DOCUMENTS

| 6,684,009 B2 * | 1/2004 | Ueda ................................ 385/37 |
| 6,922,510 B2 * | 7/2005 | Hatanaka ......................... 385/50 |
| 6,961,492 B2 * | 11/2005 | Doerr .............................. 385/39 |

(Continued)

FOREIGN PATENT DOCUMENTS

| JP | 6-18735 | 1/1994 |
| JP | 2000-162454 | 6/2000 |

(Continued)

OTHER PUBLICATIONS

International Search Report issued Aug. 16, 2011, in PCT/JP2011/061296 filed May 17, 2011.

(Continued)

*Primary Examiner* — Daniel Petkovsek
(74) *Attorney, Agent, or Firm* — Oblon, Spivak, McClelland, Maier & Neustadt, L.L.P.

(57) ABSTRACT

Disclosed are a PLC-type delay demodulation circuit and a PLC-type optical interferometer capable of reducing the size of a PLC chip with respect to the arrangement of various kinds of light output waveguides. In a PLC-type delay demodulation circuit, arm waveguides of a first MZI and arm waveguides of a second MZI are formed so as to overlap each other in the same region of a planar lightwave circuit. The optical paths of the MZIs are arranged such that the propagation directions of two DQPSK signals branched by a Y-branch waveguide are opposite to each other.

16 Claims, 7 Drawing Sheets

U.S. PATENT DOCUMENTS

| | | |
|---|---|---|
| 7,259,901 B2 * | 8/2007 | Parsons et al. ............... 359/237 |
| 7,480,091 B2 | 1/2009 | Hasegawa et al. |
| 7,649,678 B2 | 1/2010 | Hasegawa et al. |
| 7,813,032 B2 | 10/2010 | Hasegawa et al. |
| 7,884,996 B2 | 2/2011 | Hasegawa et al. |
| 7,899,279 B2 * | 3/2011 | Nasu et al. ............... 385/14 |
| 7,961,991 B2 | 6/2011 | Hasegawa et al. |
| 2003/0012479 A1 | 1/2003 | Kitou et al. |
| 2010/0046064 A1 | 2/2010 | Hasegawa et al. |
| 2010/0104237 A1 | 4/2010 | Nasu et al. |
| 2012/0154901 A1 | 6/2012 | Kawashima et al. |
| 2012/0162746 A1 | 6/2012 | Kawashima et al. |

FOREIGN PATENT DOCUMENTS

| | | |
|---|---|---|
| JP | 2003-14960 | 1/2003 |
| JP | 2003-90925 | 3/2003 |
| JP | 2007-232944 | 9/2007 |
| JP | 2009-244483 | 10/2009 |
| WO | WO 2008/084707 A1 | 7/2008 |

OTHER PUBLICATIONS

T. Hashimoto et al., "Compact DQPSK Demodulator with Interwoven Double Mach-Zehnder Interferometer using Planar Lightwave Circuit," ECOC 2008, Sep. 2008, Mo.3.C.2, vol. 1-21, 2 pages.

\* cited by examiner

PLC-TYPE DELAY DEMODULATION CIRCUIT AND PLC-TYPE OPTICAL INTERFEROMETER

BACKGROUND OF THE INVENTION

1. Field of the Invention

The present invention relates to an optical interferometer that is formed on one PLC chip and includes an optical splitter and a plurality of Mach-Zehnder interferometers.

In particular, the invention relates to a PLC-type delay demodulation circuit including a planar lightwave circuit that modulates a DQPSK-modulated optical signal.

2. Description of the Related Art

In a 40 Gbps DQPSK communication system, as a method of configuring a delay circuit that demodulates a DQPSK (Differential Quadrature Phase Shift Keying)-modulated signal (optical signal) in a PLC, a method has been proposed which configures the delay circuit including an optical splitter and two Mach-Zehnder interferometers (MZIs) (for example, see Hashimoto, Toshikazu, et al., "Compact DQPSK Demodulator with Interwoven Double Mach-Zehnder Interferometer using Planar Lightwave Circuit", ECOC 2008 Proceeding, Mo.3.C.2). In the device, it is necessary to reduce the size of a module, power consumption, and polarization dependence and obtain uniform MZI characteristics.

Bits of the optical signals that have been modulated by the delay circuit and then output from four output ends need to be input to four light receiving elements substantially at the same time. Therefore, the lengths of the optical paths from the optical splitter to the four output ends need to be exactly equal to each other.

In addition, as a method of reducing the size of a DQPSK receiver, a method has been examined which directly couples light output from a delay circuit configured as a planar lightwave circuit (PLC) to two balanced receivers or couples the light very close to the PLC chip using, for example, a lens. However, in this case, there are restrictions in the arrangement of the output ends of the delay circuit due to restrictions in the size or arrangement of the balanced receiver or an optical component, such as a lens, which makes it difficult to reduce the size of the delay circuit.

In order to meet the requirements and solve the problems, the following solving means have been proposed.

In the technique disclosed in Japanese Patent Application Laid-Open (JP-A) No. 2007-232944, a half-wave plate is inserted in the central portions of the delay lines of a single MZI, and two arm waveguides of the MZI are arranged close to each other in the insertion portion of the half-wave plate. In this way, low polarization dependence is improved.

JP-A No. 2009-244483 discloses a technique capable of reducing the size of a DQPSK delay circuit including a Y-branch waveguide and two MZIs.

However, JP-A No. 2007-232944 does not disclose an arrangement structure when a plurality of MZIs is integrated.

In the technique disclosed in JP-A No. 2007-232944, when the delay circuit is designed to have a small size under various restrictions, in some cases, the flexibility of the design is insufficient. In particular, when light output from the delay circuit configured as a PLC is directly coupled to light receiving elements (PD) or when light is coupled to the PDs substantially at the same gap as that between the output ends of the PLC chip using, for example, a lens, it is necessary to increase the gap between the output ends of the first MZI and the output ends of the second MZI due to restrictions in the size of a component, such as the PD. In the structure according to the related art, in order to meet the requirements, a waveguide for adjusting the gap between the output ends is needed, which results in an increase in the size of the device.

SUMMARY OF THE INVENTION

The invention has been made in order to solve the above-mentioned problems, and an object of the invention is to provide a PLC-type delay demodulation circuit and a PLC-type optical interferometer capable of reducing the size of a PLC chip with respect to the arrangement of various light output waveguides.

In order to achieve the object, according to a first aspect of the invention, a PLC-type delay demodulation circuit includes a planar lightwave circuit that is formed on one PLC chip and demodulates a DQPSK-modulated optical signal. The PLC-type delay demodulation circuit includes: an optical splitter that branches the DQPSK-modulated optical signal into two optical signals; and first and second Mach-Zehnder Interferometers (MZIs) that delay the branched optical signals by one bit so as to interfere with each other. Two arm waveguides of the first MZI and two arm waveguides of the second MZI are formed so as to overlap each other in the same region of the planar lightwave circuit, and optical paths of the first MZI and the second MZI are arranged such that the propagation directions of the optical signals are opposite to each other.

According to a second aspect of the invention, a PLC-type optical interferometer that is formed on one PLC chip includes: an optical splitter that branches an optical signal into two optical signals; and first and second Mach-Zehnder Interferometer (MZIs) that delay the branched optical signals by a predetermined value so as to interfere with each other. Two arm waveguides of the first MZI and two arm waveguides of the second MZI are formed so as to overlap each other in the same region of a planar lightwave circuit, and optical paths of the first MZI and the second MZI are arranged such that the propagation directions of the optical signals are opposite to each other.

DETAILED DESCRIPTION OF THE EXEMPLARY EMBODIMENTS

Figure 1:
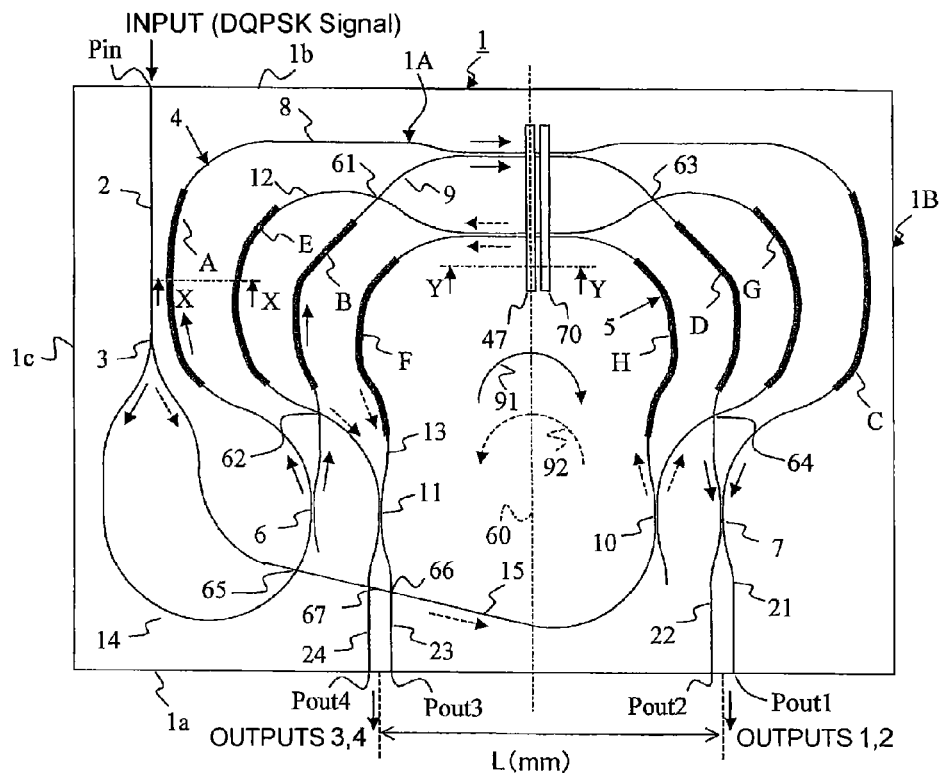
FIG. 1 is a plan view schematically illustrating the structure of a PLC-type delay demodulation circuit according to a first exemplary embodiment.

PLC-type delay demodulation circuits according to exemplary embodiments of the invention will be described with reference to the accompanying drawings.

In the following exemplary embodiments, the same components are denoted by the same reference numerals and a description thereof will not be repeated.

First Exemplary Embodiment

A PLC-type delay demodulation circuit according to a first exemplary embodiment will be described with reference to FIGS. 1 to 6.

A PLC-type delay demodulation circuit 1 shown in FIG. 1 is a planar-lightwave-circuit-type (PLC-type) delay demodulation device in which a planar lightwave circuit 1A that is made of, for example, quartz-based glass and demodulates a DQPSK-modulated optical signal (DQPSK signal) is formed on one PLC chip 1B. The PLC-type delay demodulation circuit (hereinafter, referred to as a delay demodulation device) 1 is, for example, a 40 Gbps DQPSK delay demodulation device used in a 40 Gbps DQPSK optical transmission system shown in FIG. 2.

In the specification, the "delay demodulation device 1 (PLC-type delay demodulation circuit)" used in the DQPSK optical transmission system refers to a device in which a DQPSK signal is branched into two DQPSK signals, two MZIs delay the branched DQPSK signals by one bit such that the DQPSK signals interfere with each other, thereby converting the signals into intensity-modulated optical signals (light intensity signals), and the converted four light intensity signals (I channel signals and Q channel signals) are output to four light receiving elements of two sets of balanced receivers 51 and 52. That is, in the specification, the "delay demodulation device 1" refers to an optical demodulator that does not include a balanced receiver, includes one PLC chip used in the DQPSK optical transmission system, and demodulates the DQPSK signal.

Figure 2:
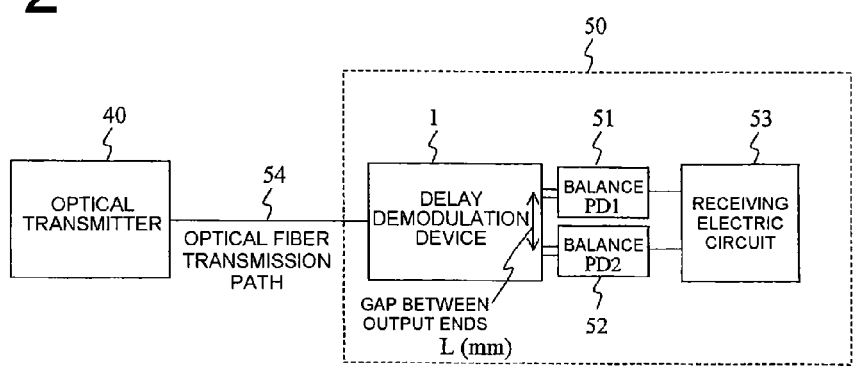
FIG. 2 is a block diagram schematically illustrating the structure of a DQPSK optical transmission system.

In the optical transmission system shown in FIG. 2, DQPSK signals are transmitted from an optical transmitter 40 to an optical fiber transmission path 54. In the DQPSK signals, four information items of the values (0, 1, 2 and 3) of symbols, each of which is 2-bit data, are modulated into phase information of the phases ($\theta$, $\theta+\pi/2$, $\theta+\pi$, and $\theta+3\pi/2$) of carrier waves according to a variation in the values of two adjacent symbols. That is, the DQPSK signal has a meaning corresponding to 2 bits such that the phase of light in one symbol (time slot) is any one of four values ($\pi/4$, $3\pi/4$, $5\pi/4$, and $7\pi/4$). Therefore, an optical receiver 50 can demodulate transmission data by detecting a phase difference (any one of the phase differences 0, $\pi/2$, $\pi$, and $3\pi/2$) between two adjacent symbols.

The DQPSK signals transmitted from the optical fiber transmission line 54 to the optical receiver 50 are converted into four light intensity signals by the delay demodulation device 1, and the light intensity signals are converted into electric signals by the balanced receivers 51 and 52. For example, a receiving electric circuit 53 performs a decoding process.

When light components (four light intensity signals) output from the delay demodulation device 1 are optically coupled to four light receiving elements of the balanced receivers 51 and 52, generally, a relative time delay of about 2 ps (picoseconds) between the four light intensity signals is needed. Therefore, a relative optical path length difference between the optical couplers needs to be equal to or less than 400 μm. In order to reduce the size of the delay demodulation device, instead of optical coupling using the optical fibers, the following methods are used: a method of directly coupling the four light intensity signals to the light receiving elements of the balanced receivers 51 and 52; and a space coupling method using a lens.

In this case, it is necessary to align the positions of the output ends for two sets of light intensity signals with the light receiving positions of the balanced receivers 51 and 52. However, the output ends need to be spaced L mm or more apart from each other due to, for example, restrictions in the sizes of the balanced receivers 51 and 52 or the sizes of components, such as lenses used for space coupling. In the receiver used in the delay demodulation device 1 according to this exemplary embodiment, since the output ends for two sets of light intensity signals need to be spaced L mm apart from each other, two sets of the output ends of the delay demodulation device 1 are set at a position where they are spaced L mm apart from each other.

The delay demodulation device 1 shown in FIG. 1 includes a light input waveguide 2 that receives DQPSK signals, a Y-branch waveguide 3 serving as an optical splitter that branches the light input waveguide 2, and first and second Mach-Zehnder interferometers 4 and 5 that delay each of the DQPSK signals branched by the Y-branch waveguide 3 by one bit. In the following description, the Mach-Zehnder interferometer is referred to as an MZI.

The first MZI 4 includes an input coupler 6 that is connected to one (waveguide 14) of two waveguides (input waveguides) 14 and 15 branched from the Y-branch waveguide 3, an output coupler 7 having two output ends connected to two light output waveguides 21 and 22, and two arm waveguides 8 and 9 that have different lengths and are connected between the two couplers 6 and 7. Similarly, the second MZI 5 includes an input coupler 10 that is connected to the other one (waveguide 15) of the two waveguides branched from the Y-branch waveguide 3, an output coupler 11 having two output ends connected to two light output waveguides 23 and 24, and two arm waveguides 12 and 13 that have different lengths and are connected between the two couplers 10 and 11.

Each of the input couplers 6 and 10 and the output couplers 7 and 11 is a 3-dB coupler (50% directional coupler) with two inputs and two outputs. One (the left input end in FIG. 1) of the two input ends of the input coupler 6 is connected to one (waveguide 14) of the two waveguides 14 and 15 branched from the Y-branch waveguide 3. One (the left input end in FIG. 1) of the two input ends of the input coupler 10 of the second MZI 5 is connected to the other one (waveguide 15) of the two waveguides 14 and 15 branched from the Y-branch waveguide 3.

In this exemplary embodiment, the waveguide 14 is connected to the left input end of the input coupler 6 and the waveguide 15 is connected to the left input end of the input coupler 10. However, the waveguide 14 may be connected to the right input end of the input coupler 6, and the waveguide 15 may be connected to the right input end of the input coupler 10. As such, it is preferable that each of the waveguide 14 and the waveguide 15 be connected to one of the two input ends of each of the input couplers 6 and 10 on the same side. This is because the same balanced receivers 51 and 52, which are a pair of the same light receiving elements, can be used for two output ends (output ports Pout1 and Pout2) of the first MZI 4 and two output ends (output ports Pout3 and Pout4) of the second MZI 5.

Two output ends (a through port and a cross port) of the output coupler 7 of the first MZI 4 are connected to the first light output waveguide 21 and the second light output waveguide 22, respectively. Similarly, two output ends (a through port and a cross port) of the output coupler 11 of the second MZI 5 are connected to the third light output waveguide 23 and the fourth light output waveguide 24, respectively.

There is an optical path length difference ΔL between the two arm waveguides 8 and 9 of the first MZI 4 such that the phase of the DQPSK signal propagated through one (long arm waveguide 8) of the arm waveguides 8 and 9 is delayed from the phase of the DQPSK signal propagated through the other arm waveguide (short arm waveguide 9) by a value (for example, when the symbol rate is 40 Gbit/s, the symbol rate of each of an I channel and a Q channel may be 20 Gbit/s (which is half of 40 Gbit/s) and thus the amount of delay is 50 ps (picoseconds)) corresponding to one bit of the symbol rate (1-bit time slot: 1 time slot). Similarly, there is an optical path length difference ΔL between the two arm waveguides 12 and 13 of the second MZI 5 such that the phase of the DQPSK signal propagated through one (long arm waveguide 12) of the arm waveguides 12 and 13 is delayed from the phase of the DQPSK signal propagated through the other arm waveguide (short arm waveguide 13) by a value (for example, a delay of 50 ps (picoseconds) when the symbol rate is 40 Gbit/s) corresponding to one bit of the symbol rate.

In addition, the two MZIs 4 and 5 have interference characteristics of a phase difference of 90°. Therefore, the optical path length difference between the two arm waveguides 8 and 9 of the first MZI 4 is the sum of the amount of delay corresponding to 1 bit and a length corresponding to a phase of ¼π of the optical signal. The optical path length difference between the two arm waveguides 12 and 13 of the second MZI 5 is the difference between the amount of delay corresponding to 1 bit and a length corresponding to a phase of ¼π of the optical signal.

In this way, there is a phase difference of 90° between the phases of the interfering light components of adjacent time slots in the first MZI 4 and the phases of the interfering light components of adjacent time slots in the second MZI 5.

The characteristics of the delay demodulation device 1 according to this exemplary embodiment are as follows.

The two arm waveguides 8 and 9 of the first MZI 4 and the two arm waveguides 12 and 13 of the second MZI 5 are formed so as to overlap each other in the same region of the planar lightwave circuit (PLC) 1A. That is, the second arm waveguide 9 of the first MZI 4 and the first arm waveguide 12 of the second MZI 5 are formed so as to overlap each other in a region surrounded by the first MZI 4 arranged on the outermost side in the planar lightwave circuit (PLC) 1A.

Two arm waveguides intersect each other at the intersection points 62 and 64, and light components (DQPSK signals) propagated through the two arm waveguides pass through the intersection portions and are then propagated through the same arm waveguides. When the intersection angle at each of the intersection points 62 and 64 is equal to or more than about 35°, intersection loss is equal to or less than 0.1 dB, and it is considered that the light components are propagated through the same waveguides before and after intersection.

The optical paths of the first MZI 4 and the second MZI 5 are arranged such that the propagation directions of the two DQPSK signals branched by the Y-branch waveguide 3 are opposite to each other.

In this exemplary embodiment, in the optical path of the first MZI 4, the DQPSK signal is propagated in the clockwise direction in the PLC chip 1B, as represented by a solid arrow 91 in FIG. 1. In the optical path of the second MZI 5, the DQPSK signal is propagated in the counterclockwise direction in the PLC chip 1B, as represented by a dashed arrow 92 in FIG. 1. In addition, in the optical path of the first MZI 4, the DQPSK signal may be propagated in the counterclockwise direction in the PLC chip 1B, and in the optical path of the second MZI 5, the DQPSK signal may be propagated in the clockwise direction in the PLC chip 1B.

Another characteristic of the delay demodulation device 1 is that the optical path length L1 of the short arm waveguide 9 of the first MZI 4 is different from the optical path length L2 of the short arm waveguide 13 of the second MZI 5 and the length of an optical path from the Y-branch waveguide 3 to the output ends (the output ports of the light output waveguides 21 and 22) of the first MZI 4 through the short arm waveguide 9 of the first MZI 4 is substantially equal to the length of an optical path from the Y-branch waveguide 3 to the output ends (the output ports of the light output waveguides 23 and 24) of the second MZI 5 through the short delay line 13 of the second MZI 5.

The lengths of four optical paths of the optical signals from the Y-branch waveguide 3 to four output ends (output ports Pout1 to Pout4) through the short arm waveguides of the MZIs 4 and 5 are as follows.

The length of an optical path from the Y-branch waveguide 3 to the output port (output end) Pout1 through the waveguide 14, the input coupler 6 of the first MZI 4, the short arm waveguide 9, the output coupler 7, and the first light output waveguide 21 is L21.

The length of an optical path from the Y-branch waveguide 3 to the output port (output end) Pout2 through the waveguide 14, the input coupler 6 of the first MZI 4, the short arm waveguide 9, the output coupler 7, and the second light output waveguide 22 is L22.

The length of an optical path from the Y-branch waveguide 3 to the output port (output end) Pout3 through the waveguide 15, the input coupler 10 of the second MZI 5, the short arm waveguide 13, the output coupler 11, and the third light output waveguide 23 is L23.

The length of an optical path from the Y-branch waveguide 3 to the output port (output end) Pout4 through the waveguide 15, the input coupler 10 of the second MZI 5, the short arm waveguide 13, the output coupler 11, and the fourth light output waveguide 24 is L24.

That is, another characteristic is that the optical path length L1 of the short arm waveguide 9 of the first MZI 4 is different from the optical path length L2 of the short arm waveguide 13 of the second MZI 5 and the four optical path lengths L21 to L24 are equal to each other.

In this exemplary embodiment, in order to achieve another characteristic, the optical path length L1 of the arm waveguide 9 is greater than the optical path length L2 of the arm waveguide 13, the optical path lengths of the first to fourth light output waveguides 21 to 24 are equal to each other, and the length of the waveguide 15 is greater than that of the waveguide 14 by a value L1−L2.

In this case, the waveguide 14 is a U-shaped waveguide and the waveguide 15 is arranged so as to intersect the waveguide 14 and the third and fourth light output waveguides 23 and 24. In this way, it is possible to easily adjust the lengths of the waveguides 14 and 15 in a narrow region.

Next, the waveguides 14 and 15 will be described in detail.

An input end (input port Pin) of the light input waveguide 2 is provided at an end surface 1b, which is one (upper long side) of the long sides of the PLC chip 1B having a rectangular shape in a plan view. The light input waveguide 2 extends in a straight line from the input port Pin along an end surface 1c, which is one (left short side) of the short sides of the PLC chip 1B, and is then connected to the input end of the Y-branch waveguide 3.

The waveguide 14 connected to one output end of the Y-branch waveguide 3 is a U-shaped waveguide including a straight waveguide that extends along the end surface 1c and a curved waveguide that is curved at an angle of about 180°. The waveguide 14 connects the Y-branch waveguide 3 and the input coupler 6.

The waveguide 15 connected to the other output end of the Y-branch waveguide 3 includes a waveguide that is curved at an angle of about 90° inside the waveguide 14, a straight waveguide that intersects the waveguide 14 and the third and fourth light output waveguides 23 and 24 and extends along the end surface 1a, and a waveguide that is curved at an angle of about 90°. The waveguide 15 connects the Y-branch waveguide 3 and the input coupler 10.

Another characteristic of the delay modulation device 1 is that the central portions of the two arm waveguides 8 and 9 of the first MZI 4 and the central portions of the two arm waveguides 12 and 13 of the second MZI 5 are arranged in a line.

In the delay demodulation device 1, the two arm waveguides 8 and 9 of the first MZI 4 and the two arm waveguides 12 and 13 of the second MZI 5 are formed in the same region of the planar lightwave circuit (PLC) 1A such that the short arm waveguide 9 of the first MZI 4 and the long arm waveguide 12 of the second MZI 5 intersect each other at four points.

That is, as shown in FIG. 1, the arm waveguide 9 of the first MZI 4 and the arm waveguide 12 of the second MZI 5 intersect each other at intersection points 61 to 64.

The two arm waveguides intersect each other at the intersection points 61 to 64, and light components (DQPSK signals) propagated through the two arm waveguides pass through the intersection portions and are then propagated through the same arm waveguides. For example, the two arm waveguides 9 and 12 intersect each other at the intersection point 61 and the DQPSK signals propagated through the two arm waveguides 9 and 12 pass through the intersection portion and are then propagated through the same arm waveguides 9 and 12.

The planar lightwave circuit 1A shown in FIG. 1 is a circuit including, for example, the light input waveguide 2, the Y-branch waveguide 3, the first and second MZIs 4 and 5, and the four light output waveguides 21 to 24, which are made of quartz-based glass. The delay demodulation device 1 including the planar lightwave circuit 1A is manufactured as follows.

Figure 3:
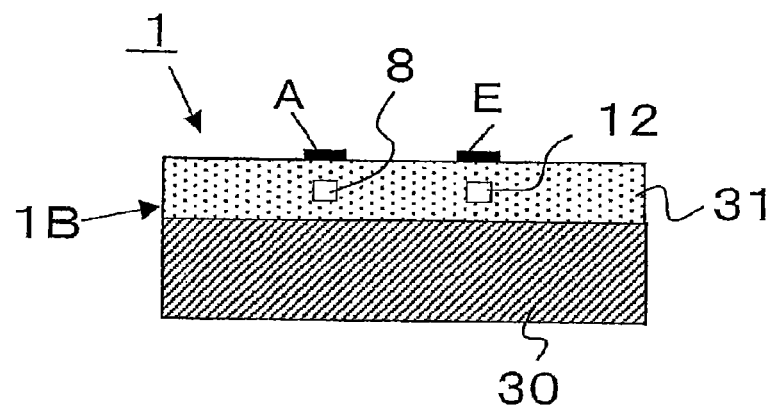
FIG. 3 is a cross-sectional view taken along the line X-X of FIG. 1.

A silica material ($SiO_2$-based glass particles) for forming a lower cladding layer and a core layer is deposited on a PLC substrate 30, such as a silicon substrate shown in FIG. 3, by a flame hydrolysis deposition (FHD) method. Then, heating is performed to fuse a glass film and make the glass film transparent. Then, desired waveguides are formed by photolithography and reactive ion etching, and an upper cladding layer is formed by the FHD method. In FIG. 3, a cladding layer 31 including the lower cladding layer and the upper cladding layer is formed on the PLC substrate 30, and the arm waveguides 9 and 12 are formed as a core layer in the cladding layer 31. The PLC substrate 30 has a rectangular shape in a plan view, as shown in FIG. 1. The planar shape of the PLC substrate 30 is not limited to the rectangle, but it may be a square shape or other shapes.

In the delay demodulation device 1 according to this exemplary embodiment, the first MZI 4 and the second MZI 5 are formed on the PLC substrate 30, which is a planar lightwave circuit board, so as to be substantially symmetric with respect to an insertion portion (center line 60) of a first half-wave plate 47.

In order to reduce a polarization dependent frequency PDf, the first half-wave plate 47 whose main axis is inclined at an angle of 45° with respect to the refractive index main axis of the arm waveguide is inserted in the central portions of the two arm waveguides 8 and 9 of the first MZI 4 and the central portions of the two arm waveguides 12 and 13 of the second MZI 5 in the delay demodulation device 1.

In addition, in the delay demodulation device 1, a second half-wave plate 70 whose main axis is parallel or horizontal to the refractive index main axis of the arm waveguide is inserted at a position that is spaced 200 μm apart from the central portions (center line 60 in FIG. 1) of the two arm waveguides 8 and 9 of the first MZI 4 to the output side and a position that is spaced 200 μm apart from the central portions of the two arm waveguides 12 and 13 of the second MZI 5 to the input side, in order to prevent the deterioration of the polarization dependent frequency PDf due to polarization in the coupler.

Even when polarization occurs in the coupler, as described in WO 2008/084707, the use of the first and second half-wave plates 47 and 70 enables the interference conditions of polarized light to be the same as the interference conditions of general non-polarized light. Therefore, the polarization dependence of an interference circuit does not occur.

Figure 4:
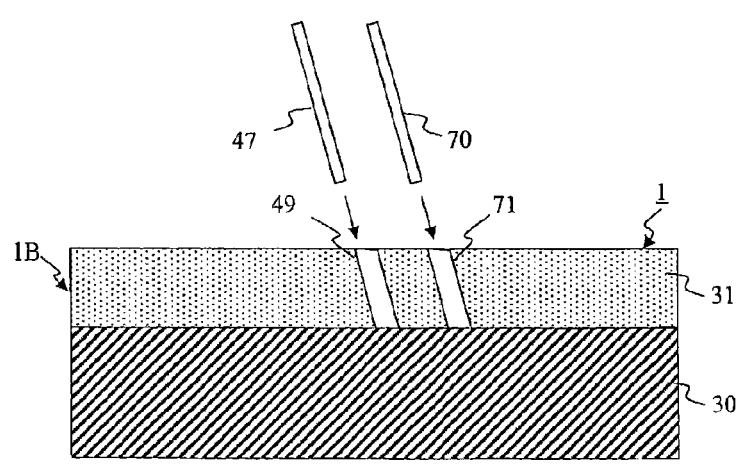
FIG. 4 is a cross-sectional view taken along the line Y-Y of FIG. 1.

As shown in FIG. 4, a groove 49 for inserting the first half-wave plate 47 and a groove 71 for inserting the second half-wave plate 70 are formed in the cladding layer 31. The groove 49 and the groove 71 are inclined at an angle of about 8° in order to prevent loss due to the reflection of light from the half-wave plates 47 and 70. As shown in FIG. 4, the half-wave plates 47 and 70 are respectively arranged in the grooves 49 and 71 while being inclined at an angle of about 8°. The grooves 49 and 71 are vertical to the waveguides in the plane of the substrate and are inclined at an angle of about 8° in the vertical direction (the thickness direction of the substrate) so as to pass through the centers of the two MZIs.

In the delay demodulation device 1, as shown in FIG. 1, the central portions of the two arm waveguides 8 and 9 of the first MZI 4 extend in parallel so as to be close to each other, and the central portions of the two arm waveguides 12 and 13 of the second MZI 5 extend in parallel so as to be close to each other.

At the centers of the arm waveguides 8 and 9 and the centers of the arm waveguides 12 and 13, portions into which the half-wave plates 47 and 70 are inserted have a large width in order to prevent diffraction loss.

In FIG. 1, the half-wave plate 70 is arranged close to the half-wave plate 47, but the position of the half-wave plate 70 is not limited thereto. It is preferable that the half-wave plate 70 be arranged close to the half-wave plate 47 in a portion with a large width in each of the arm waveguides 8, 9, 12, and 13 where the half-wave plate 47 is arranged.

Another characteristic of the delay demodulation device 1 is as follows.

As shown in FIG. 1, the output ends (the output ports Pout1 and Pout2) of two light output waveguides 21 and 22 and the output ends (the output ports Pout3 and Pout4) of two light output waveguides 23 and 24 are formed at the same end surface 1a of the PLC chip 1B.

The two output ends (the output ports Pout1 and Pout2) of the first MZI 4 and the two output ends (the output ports Pout3 and Pout4) of the second MZI 5 are arranged on both sides of the center of the MZIs represented by the center line 60 in FIG. 1 at the same end surface 1a of the PLC chip 1B.

The gap (the gap between the output ports Pout1 and Pout3) between the first light output waveguide 21 and the third light output waveguide 23 and the gap (the gap between the output ports Pout2 and Pout4) between the second light output waveguide 22 and the fourth light output waveguide 24 are L mm. In addition, the gap (the gap between the output ports Pout1 and Pout2) between the first light output waveguide 21 and the second light output waveguide 22 and the gap (the gap between the output ports Pout3 and Pout4) between the third light output waveguide 23 and the fourth light output waveguide 24 are, for example, 125 μm.

The end of the light input waveguide 2 is formed at the end surface 1b of the PLC chip 1B opposite to the end surface 1a.

In the delay demodulation device 1, heaters are formed on the two arm waveguides 8 and 9 of the first MZI 4 and the two arm waveguides 12 and 13 of the second MZI 5.

In this exemplary embodiment, for example, heaters A and C are formed on the arm waveguide 8 on both sides of the center thereof, and heaters B and D are formed on the arm waveguide 9 on both sides of the center thereof. In addition, heaters E and G are formed on the arm waveguide 12 on both sides of the center thereof, and heaters F and H are formed on the arm waveguide 13 on both sides of the center thereof. Each of the heaters A to H is a Ta-based thin film heater that is formed on the upper cladding (the cladding layer 31 shown in FIG. 3) by sputtering, above the corresponding arm waveguide. FIG. 3 shows the heaters A and E that are formed on the cladding layer 31 above the arm waveguides 8 and 12, respectively.

In the delay demodulation device 1, the output ends of the light output waveguides 21 and 22 are the first and second output ports Pout1 and Pout2 that output light intensity signals (intensity-modulated optical signals), which are outputs 1 and 2 (see FIG. 5), having a phase difference of π therebetween. The output ends of the light output waveguides 23 and 24 are the third and fourth output ports Pout3 and Pout4 that output light intensity signals, which are outputs 3 and 4 (see FIG. 5), having a phase difference of π therebetween.

In the delay demodulation device 1 having the above-mentioned structure, in the first MZI 4, the DQPSK signal (optical signal) transmitted from the optical fiber transmission path 54 to the optical receiver 50 is branched by the Y-branch waveguide 3 and the branched DQPSK signals are propagated through the two arm waveguides 8 and 9 with different lengths in the clockwise direction, as represented by the solid arrow 91 in FIG. 1. The MZI 4 delays the phase of the DQPSK signal propagated through the arm waveguide 8 from the phase of the optical signal propagated through the arm waveguide 9 by $+\frac{1}{4}\pi$ corresponding to one bit of the symbol rate. Similarly, in the second MZI 5, the DQPSK signals branched by the Y-branch waveguide 3 are propagated through the arm waveguides 12 and 13 in the counterclockwise direction, as represented by the dashed arrow 92 in FIG. 1. The MZI 5 delays the phase of the DQPSK signal propagated through the arm waveguide 12 from the phase of the optical signal propagated through the arm waveguide 13 by $-\frac{1}{4}\pi$ corresponding to one bit of the symbol rate.

The delay demodulation device 1 drives the heaters A to D of the MZI 4 and the heaters E to H of the MZI 5 to adjust the polarization dependent frequency PDf or perform phase adjustment (phase trimming) such that the phase difference between the two MZIs 4 and 5 is π/2.

EXAMPLES

The planar lightwave circuit (PLC) 1A including the input waveguide 2, the Y-branch waveguide 3, the MZIs 4 and 5, and the light output waveguides 21 to 24, which were made of quartz-based glass, was formed on the silicon substrate 30 shown in FIG. 3 by a flame hydrolysis deposition (FHD) method, photolithography, and reactive ion etching, thereby manufacturing the 40 Gbps DQPSK delay demodulation device 1. In addition, the grooves 49 and 71 (see FIG. 4) were formed by dicing and the half-wave plates 47 and 70 were inserted into the grooves 49 and 71.

In the manufactured delay demodulation device 1, the difference (specific refractive index difference Δ) between the refractive index of the cladding layer and the refractive index of the core layer was 1.5%, and the circuit (the PLC chip 1B) had a small size of 13 mm×17.5 mm. FSR was 23 GHz. Some of the heaters on the two MZIs 4 and 5 were driven to adjust the polarization dependent frequency PDf. After the adjustment, some of the heaters on the two MZIs 4 and 5 were driven to perform phase adjustment (phase trimming) such that the phase difference between the two MZIs 4 and 5 was π/2. That is, interference characteristics in which a phase difference of 90° occurred between the two MZIs 4 and 5 were obtained by the phase adjustment.

At that time, the half-wave plates 47 and 70 were selected and used such that good PDf characteristics were obtained from both the MZI 4 and the MZI 5.

Then, a fiber block including one optical fiber was connected to the end surface 1b of the PLC chip 1B in which the end (input port Pin) of the light input waveguide 2 to which the DQPSK signal (optical signal) was input was provided. A method of directly coupling four light intensity signals to the light receiving elements of the balanced receivers 51 and 52 or a space coupling method using a lens was used to optically couple light components (four light intensity signals), which were outputs 1 to 4, output from the output ports Pout1 to Pout4, and packaging was performed. In addition, a Peltier element and a thermostat were used as a temperature control mechanism. In this way, a module including the delay demodulation device 1 was manufactured.

Figure 5:
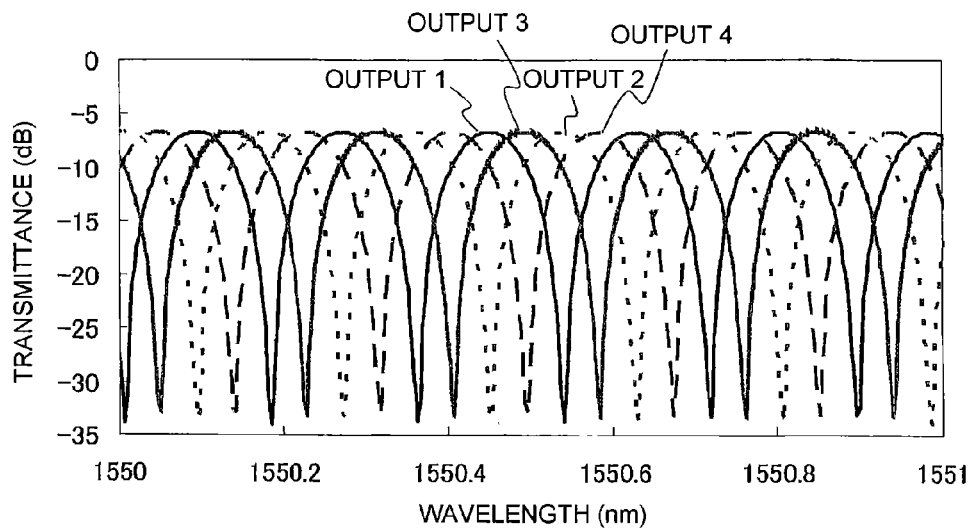
FIG. 5 is a graph illustrating the spectrum of the PLC-type delay demodulation circuit.
Figure 6:
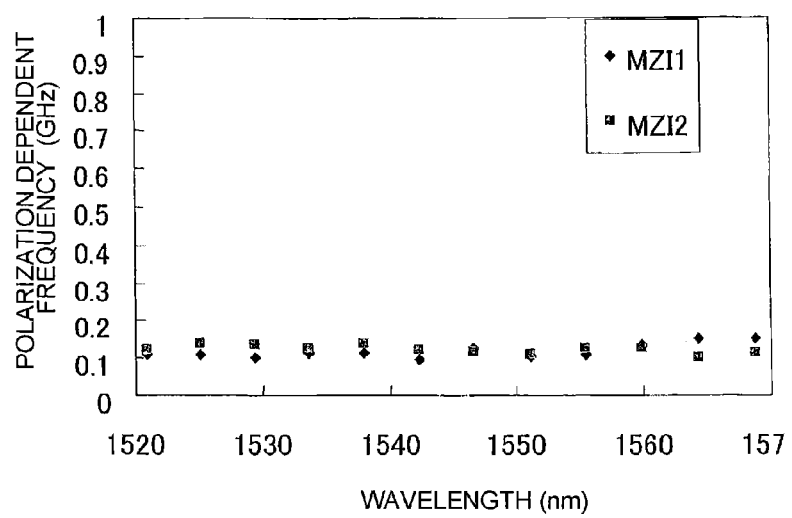
FIG. 6 is a graph illustrating the wavelength dependence of PDf of the PLC-type delay demodulation circuit.

The insertion loss spectrum and the polarization dependent frequency PDf of the manufactured 40 Gbps DQPSK delay demodulation device (DQPSK PLC-type delay demodulation circuit) 1 were evaluated in the C-band (1520 nm to 1570 nm) generally used in multi-wavelength optical communication. FIG. 5 shows the spectrum in the vicinity of a wavelength of 1550 nm, and FIG. 6 shows PDf in the entire C-band. First, as can be seen from FIG. 5, a good interference spectrum is obtained. The insertion loss was equal to or less than 6.6 dB in the entire C-band. As can be seen from FIG. 6, when PDf is equal to or less than 0.2 GHz, good characteristics are obtained in the entire C-band.

Figure 7:
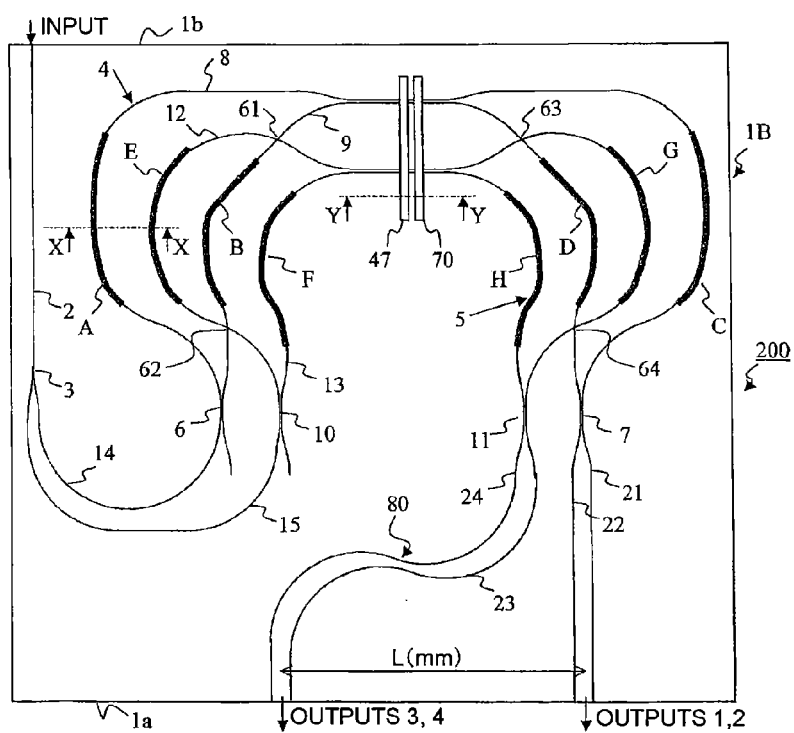
FIG. 7 is a plan view schematically illustrating the structure of a PLC-type delay demodulation circuit according to a comparative example.

FIG. 7 is a diagram schematically illustrating the structure of a PLC-type delay demodulation circuit 200 according to a comparative example. In the comparative example, the optical paths of both a first MZI 4 and a second MZI 5 are arranged in a PLC chip 1B in the clockwise direction.

In the comparative example, a waveguide 80 for adjusting the gap between the output ends is provided in order to meet the requirements that the gap between the output ends of the two MZIs 4 and 5 (the gap between the output ports Pout1 and Pout2 and the output ports Pout3 and Pout4) is L mm or more due to, for example, restrictions in the sizes of the balanced receivers 51 and 52 or the sizes of components, such as lenses used for space coupling. The other structures of the comparative example are the same as those of the delay demodulation device 1 according to the first exemplary embodiment shown in FIG. 1.

In the comparative example shown in FIG. 7, since the waveguide 80 for adjusting the gap between the output ends is provided, a chip size (the size of the PLC chip 1B) is 15 mm×17.5 mm, which is greater than that of the PLC chip 1B in the delay demodulation device 1 shown in FIG. 1.

The first exemplary embodiment having the above-mentioned structure has the following operation and effects.

(1) The arm waveguides 8 and 9 of the first MZI 4 and the arm waveguides 12 and 13 of the second MZI 5 are formed so as to overlap each other in the same region of the planar lightwave circuit 1A. Two DQPSK signals branched by the Y-branch waveguide 3 are propagated through the optical paths of the first MZI 4 and the second MZI 5 in the opposite direction.

According to this structure, it is possible to design a small delay demodulation device 1 with respect to the arrangement of various kinds of light output waveguides. In particular, this structure is effective when the gap between the first and second light output waveguides 21 and 22 and the third and fourth light output waveguides 23 and 24 is large at the same end surface of the PLC chip due to restrictions in the arrangement of the balanced receivers 51 and 52 and the chip size of the delay demodulation device 1 is increased for converting the gap between the light output waveguides.

(2) The output ends (output ports Pout1 and Pout2) of the MZI 4 and the output ends (output ports Pout3 and Pout4) of the MZI 5 are arranged at the same end surface 1a of the PLC chip 1B so as to be separated from each other, for example, the output ends are arranged on both sides of the centers (center line 60) of the MZIs, without providing the waveguide 80 for adjusting the gap between the output ends, unlike the comparative example shown in FIG. 7. Therefore, it is possible to meet the requirements that the output ends of the MZIs 4 and 5 are arranged on both sides of the centers (center line 60) of the MZIs at the same end surface 1a of the PLC chip 1B with an arbitrary gap therebetween, due to, for example, restrictions in the sizes of the light receiving elements or the sizes of components, such as lenses, when the light components output from the MZIs 4 and 5 are directly coupled to the balanced receivers 51 and 52 or when the light components are coupled very close to the PLC chip 1B by, for example, lenses, while reducing the size of the PLC chip 1B.

(3) The optical path length L1 of the short arm waveguide 9 of the first MZI 4 is different from the optical path length L2 of the short arm waveguide 13 of the second MZI 5 and the length of the optical path from the Y-branch waveguide 3 to the output ends of the first MZI 4 through the short arm waveguide 9 of the first MZI 4 is substantially equal to the length of the optical path from the Y-branch waveguide 3 to the output ends of the second MZI 5 through the short arm waveguide 13 of the second MZI 5. Therefore, it is possible to improve the flexibility of the design and the arm waveguides 9 and 13 are arranged with a small number of intersection points therebetween. Therefore, it is possible to reduce the size of a delay demodulation device, as compared to the structure in which the arm waveguide 9 and the arm waveguide 13 have the same optical path length.

(4) The waveguide 14 is a U-shaped waveguide, and the waveguide 15 is arranged so as to intersect the waveguide 14, the third light output waveguide 23, and the fourth light output waveguide 24 at intersection points 65 to 67. Therefore, it is possible to appropriately adjust the lengths of the waveguides 14 and 15 in a narrow region.

(5) The central portions of the arm waveguides of the MZIs 4 and 5 are arranged in a line. Therefore, even when the propagation directions of the MZIs 4 and 5 are opposite to each other, it is possible to arrange one wave plate 47 in the central portions of the arm waveguides of the MZIs 4 and 5. In this way, it is possible to reduce the polarization dependence of the MZIs 4 and 5 under the same conditions.

(6) As an example of the overlap between the MZIs 4 and 5, the arm waveguides 8 and 9 of the MZI 4 and the arm waveguides 12 and 13 of the MZI 5 are formed in the same region of the planar lightwave circuit (PLC) 1A such that the short arm waveguide 9 of the MZI 4 and the long arm waveguide 12 of the MZI 5 intersect each other at four points. According to this structure, it is possible to reduce the overall size of the planar lightwave circuit 1A. In particular, the area of a portion including the arm waveguides 8 and 9 of the first MZI 4 and the arm waveguides 12 and 13 of the second MZI 5 is reduced. Therefore, it is possible to reduce the size of the PLC chip 1B.

(7) Since the size of the PLC chip 1B is reduced, a stress distribution in the plane of the PLC chip 1B which causes birefringence is reduced, and it is possible to significantly reduce the shift of the center wavelength due to a variation in the environment temperature. In this way, it is possible to obtain a delay demodulation device with little wavelength shift due to a variation in the environment temperature and a small initial polarization dependent frequency PDf.

(8) When the size of the PLC chip 1B is reduced, it is also expected that the size or power consumption of a delay demodulation module using the delay demodulation device 1 will be reduced.

(9) The first MZI 4 and the second MZI 5 are formed on the PLC substrate 30 so as to be symmetric with respect to the vertical axis. Therefore, it is possible to further reduce the size and polarization dependent frequency PDf of the PLC chip 1B.

(10) The half-wave plate 47 is inserted in the central portions of the arm waveguides 8 and 9 of the first MZI 4 and the central portions of the arm waveguides 12 and 13 of the second MZI 5. Therefore, it is possible to reduce the polarization dependent frequency PDf.

(11) The arm waveguides 8 and 9 of the first MZI 4 extend in parallel so as to be close to each other in a portion in which the first half-wave plate 47 is provided, and the arm waveguides 12 and 13 of the second MZI 5 extend in parallel so as to be close to each other in a portion in which the first half-wave plate 47 is provided. According to this structure, it is possible to reduce the influence of the positional dependence of the polarization conversion efficiency of the half-wave plate 47 at a position where the half-wave plate 47 intersects the arm waveguides 8 and 9 of the MZI 4 and the influence of the positional dependence of the polarization conversion efficiency of the half-wave plate 47 at a position where the half-wave plate 47 intersects the arm waveguides 12 and 13 of the MZI 5.

(12) Each of the waveguides 14 and 15 is connected to one of two input ends of each of the input couplers 6 and 10 on the same side. According to this structure, it is possible to use the balanced receivers 51 and 52, which are pairs of the same light receiving elements, at two output ends of the first MZI 4 and two output ends of the second MZI 5.

(13) The heaters A to H are formed on the two arm waveguides of each of the first and second MZIs 4 and 5. Therefore, it is possible to drive some of the heaters of the two MZIs 4 and 5 to adjust the polarization dependent frequency PDf. After the adjustment, it is possible to drive some of the heaters of the two MZIs 4 and 5 to perform phase adjustment (phase trimming) such that the phase difference between the two MZIs 4 and 5 is $\pi/2$.

In the first exemplary embodiment, loss occurs in the intersection portions at the intersection points 61 to 67, but the total loss of the intersection portions is about 0.1 dB, which does not cause a practical problem.

Second Exemplary Embodiment

Figure 8:
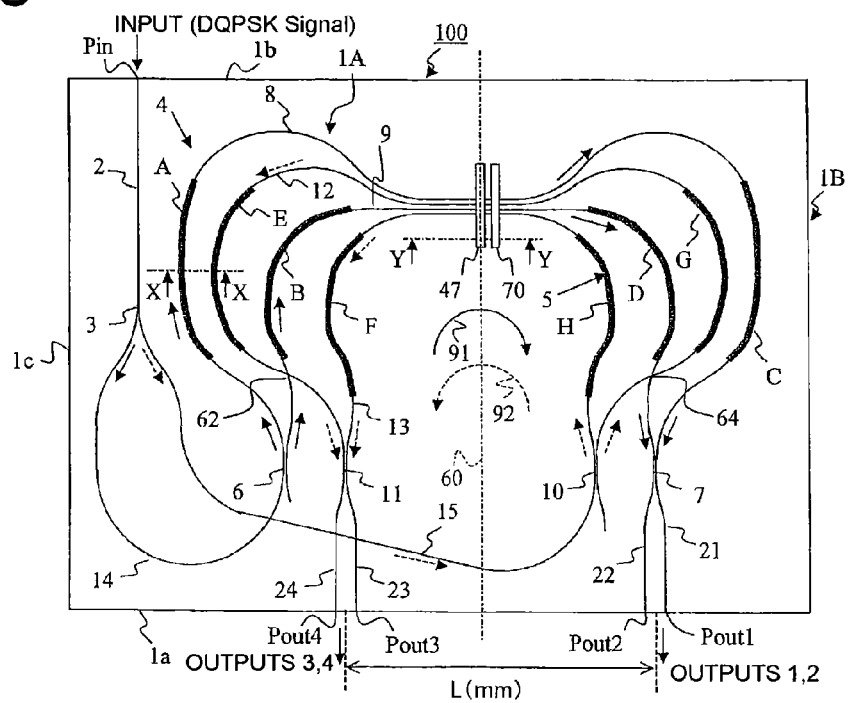
FIG. 8 is a plan view schematically illustrating the structure of a PLC-type delay demodulation circuit according to a second exemplary embodiment.

A planar-lightwave-circuit-type delay demodulation device 100 according to a second exemplary embodiment of the invention will be described with reference to FIG. 8.

One characteristic of the delay demodulation device 100 according to the second exemplary embodiment is that a first half-wave plate 47 is provided in the central portions of arm waveguides 8 and 9 of a first MZI 4 and the central portions of arm waveguides 12 and 13 of a second MZI 5 so as to intersect all of the four arm waveguides 8, 9, 12, and 13 and the four arm waveguides 8, 9, 12, and 13 extend in parallel so as to be close to each other in a portion in which the first half-wave plate 47 is provided.

Similarly, a second half-wave plate 70 is provided in the central portions of the arm waveguides 8 and 9 of the first MZI 4 and the central portions of the arm waveguides 12 and 13 of the second MZI 5 so as to intersect all of the four arm waveguides 8, 9, 12, and 13 and the four arm waveguides 8, 9, 12, and 13 extend in parallel so as to be close to each other in a portion in which the second half-wave plate 70 is provided.

Another characteristic of the delay demodulation device 100 is as follows.

The arm waveguides 8 and 9 of the first MZI 4 and the arm waveguides 12 and 13 of the second MZI 5 are formed in the same region of a planar lightwave circuit 1A such that the short arm waveguide 9 of the first MZI 4 and the long arm waveguide 12 of the second MZI 5 intersect each other at two points (intersection points 62 and 64) on both sides of the first half-wave plate 47. In the arrangement of four arm waveguides in the insertion portion of the half-wave plate 47, one of the two arm waveguides 12 and 13 of the MZI 5 is arranged between the two arm waveguides 8 and 9 of the MZI 4.

In this exemplary embodiment, for example, in the arrangement of the arm waveguides in the insertion portions of the wave plates, the arm waveguides of one of the two MZIs are arranged between the arm waveguides of the other MZI such that the long arm waveguide 8 of the MZI 4, the long arm waveguide 12 of the MZI 5, the short arm waveguide 9 of the MZI 4, and the short arm waveguide 13 of the MZI 5 are arranged in this order.

In the delay demodulation device 1 according to this exemplary embodiment, the gap between the four arm waveguides 8, 9, 12, and 13 in the insertion portions of the wave plates is 40 μm and the half-wave plates 47 and 70 with a length of 2 mm are inserted.

As a result, even when the half-wave plates 47 and 70 having the positional dependence of polarization conversion efficiency are used, the delay demodulation device 100 is less likely to be affected by the positional dependence of polarization conversion efficiency. Even when the half-wave plates 47 and 70 that are incapable of simultaneously obtaining a good PDf from the two Mach-Zehnder interferometers 4 and 5 in the delay demodulation device 1 according to the first exemplary embodiment are used, it is possible to obtain a good PDf of 0.2 GHz or less by using only a good characteristic portion of the half-wave plates 47 and 70, similar to the delay demodulation device 1.

The delay demodulation device 100 according to the second exemplary embodiment has the following operation and effects, in addition to the operation and effects of the first exemplary embodiment.

(1) Since the four arm waveguides 8, 9, 12, and 13 extend in parallel so as to be close to each other in a portion in which the half-wave plates 47 and 70 are provided, all of the four arm waveguides pass through only a narrow region of the half-wave plates 47 and 70. The delay demodulation device 100 is less likely to be affected by the positional dependence of the polarization conversion efficiency of the half-wave plates 47 and 70, and it is easy to obtain good characteristics from both the MZIs 4 and 5.

As a result, even when the half-wave plates 47 and 70 having the positional dependence of polarization conversion efficiency are used, the delay demodulation device 100 is less likely to be affected by the positional dependence of polarization conversion efficiency. Therefore, even when the half-wave plates 47 and 70 that are incapable of simultaneously obtaining a good PDf from the two MZIs 4 and 5 in the delay demodulation device 1 according to the first exemplary embodiment are used, it is possible to obtain a good PDf of 0.2 GHz or less by using only a good characteristic portion (narrow region) of the half-wave plates 47 and 70, similar to the delay demodulation device 1.

(2) The arm waveguides 8 and 9 of the MZI 4 and the arm waveguides 12 and 13 of the MZI 5 are formed in the same region of the planar lightwave circuit 1A such that the short arm waveguide 9 of the MZI 4 and the long arm waveguide 12 of the MZI 5 intersect each other at two points on both sides of the half-wave plate 47. In the arrangement of four arm waveguides in the insertion portion of the half-wave plate 47, one of the two arm waveguides 12 and 13 of the MZI 5 is arranged between the two arm waveguides 8 and 9 of the MZI 4. According to this arrangement, it is possible to minimize the number of intersection points and reduce the gap between the four arm waveguides in the insertion portion of the wave plate.

Third Exemplary Embodiment

A planar-lightwave-circuit-type delay demodulation device according to the third exemplary embodiment of the invention will be described with reference to FIG. 1 and FIGS. 9-11.

The delay demodulation device according to the present embodiment has a characteristic that input couplers 6, 10 and output couplers 7, 11 of the delay demodulation device according to the first exemplary embodiment are replaced with a Wavelength Insensitive Coupler (WINC). It is noted that other components are same as ones of the first exemplary embodiment.

The WINC is comprised of directional couplers having coupling rates of about 50% and 100% respectively, and a Mach-Zehnder Interferometer consisting of two arm waveguides binding directional couplers above and having an optical path length difference of about 0.35 um. Comparing to a directional coupler in general, a wavelength dependence of coupling efficiency is reduced in the WINC above.

Figure 9:
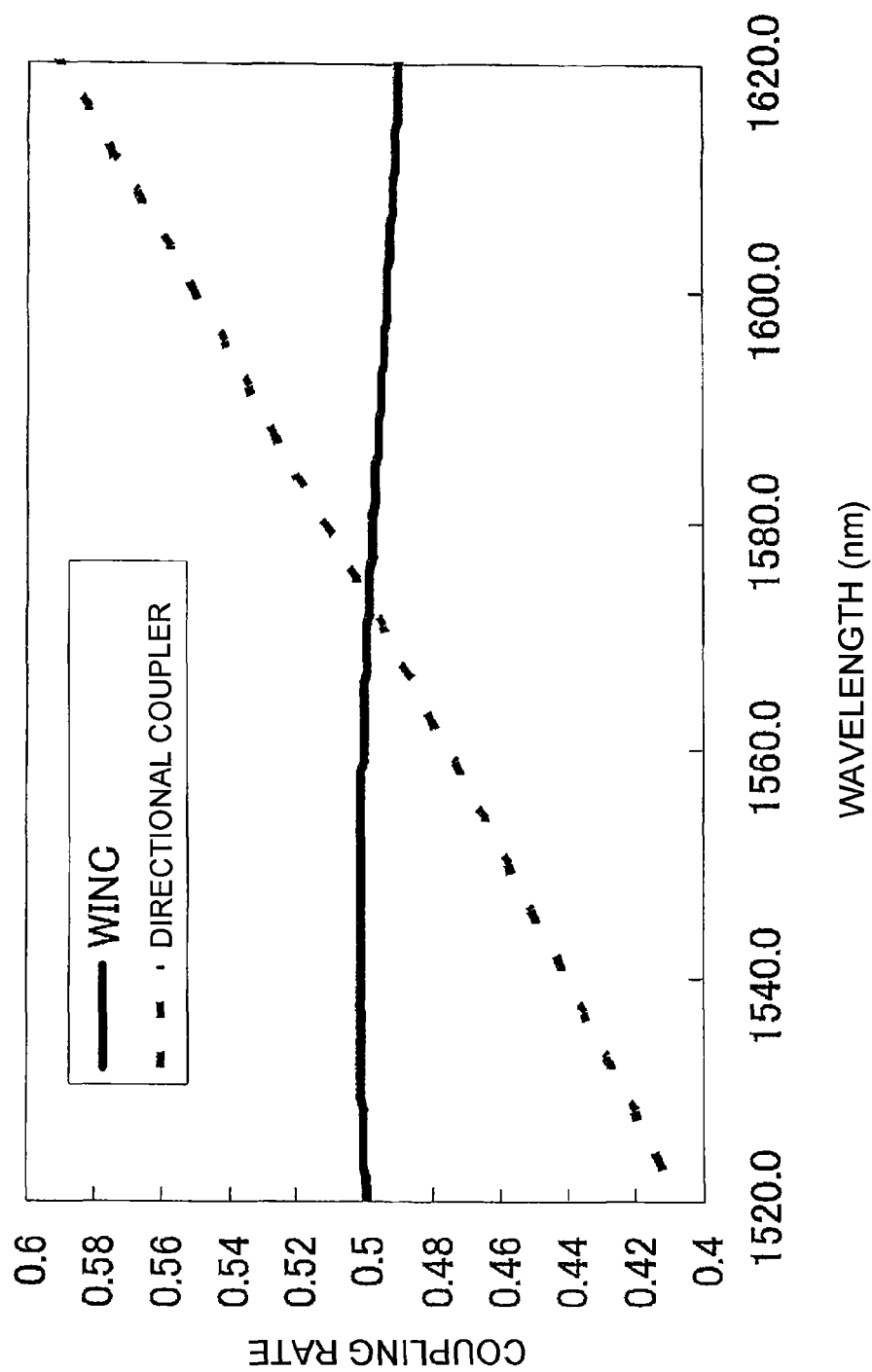
FIG. 9 is a diagram for characteristics showing wavelength-characteristic-calculated values (as a solid line) of coupling efficiency of a WINC used as input and output couplers of a PLC-type delay demodulation circuit according to a fourth exemplary embodiment, and also showing wavelength-characteristic-calculated values (as a broken line) of coupling efficiency of a general directional coupler as a comparison.

FIG. 9 shows wavelength-characteristic-calculated values of coupling efficiency of the WINC above and the values are indicated as a solid line. As a comparison, wavelength-characteristic-calculated values of coupling efficiency of a general directional coupler are indicated as a broken line. As can be seen from FIG. 9 above, in the WINO (the solid line), coupling efficiency of about 50% is obtained in the entire C-L bands (about 1520 nm-about 1620 nm) and the wavelength-characteristic becomes flatten in large scale to compare with the general directional coupler (see the broken line).

Figure 10A:
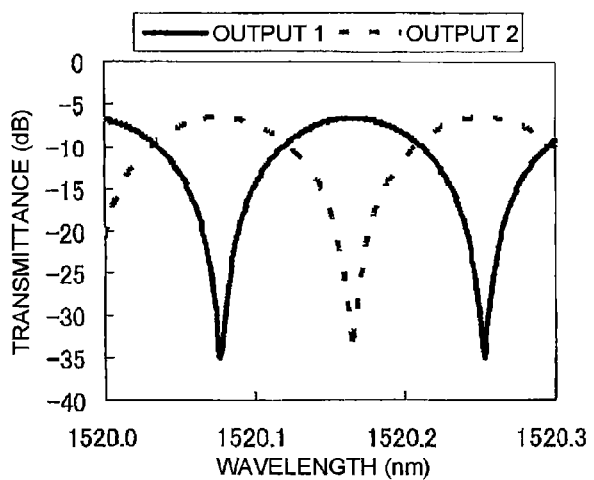
FIGS. 10A, 10B and 10C are diagrams for characteristics showing spectrum, in the vicinity of wavelength of 1520 nm, 1570 nm and 1620 nm respectively, of output ports 1 and 2 of a delay demodulation device with using the WINC according to the third exemplary embodiment.
Figure 10B:
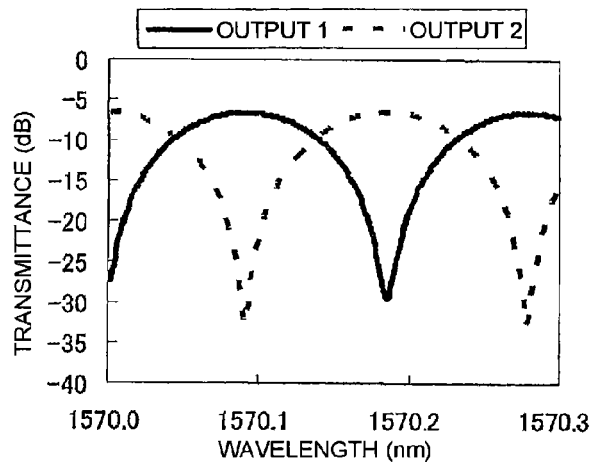
Figure 10C:
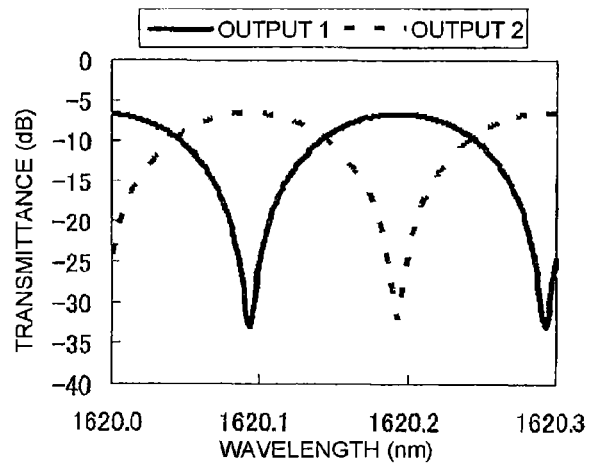
Figure 11A:
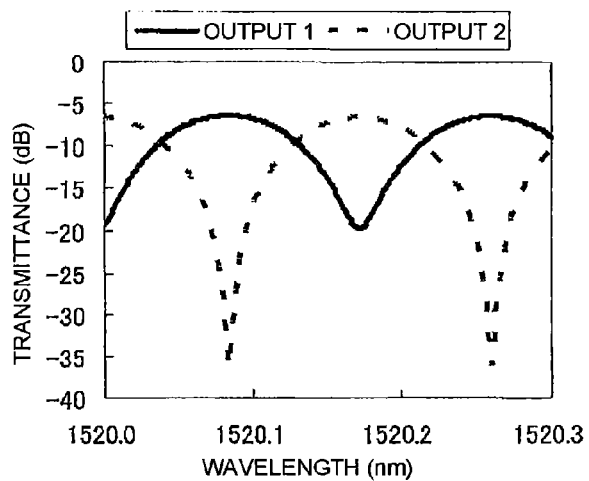
FIGS. 11A, 11B and 11C are diagrams for characteristics showing spectrum, in the vicinity of wavelength of 1520 nm, 1570 nm and 1620 nm respectively, of output ports 1 and 2 of a delay demodulation device with using a general directional coupler.
Figure 11B:
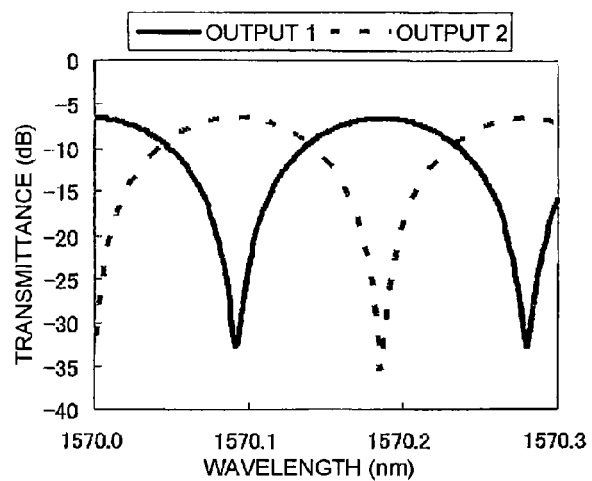
Figure 11C:
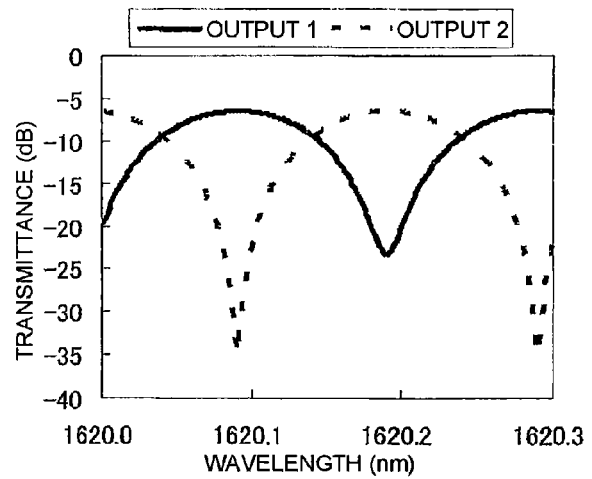

FIGS. 10A, 10B and 10C respectively show spectrum, in the vicinity of wavelength of 1520 nm, 1570 nm and 1620 nm, of output ports 1 and 2 (Pout 1 and Pout 2) of the delay demodulation device of the present exemplary embodiment with using the WINO above. As a comparison, FIGS. 11A, 11B and 11C respectively show spectrum, in the vicinity of wavelength of 1520 nm, 1570 nm and 1620 nm, of output ports 1 and 2 (Pout 1 and Pout 2) of a delay demodulation device with using a general directional coupler. As can be seen from FIGS. 11A, 11B and 11C, when the general directional coupler is used, the extinction ratio (the difference between the maximum value and the minimum value of transmittance) of the output 1 (through port of MZI 1) deteriorates massively as the wavelength becomes away from the value around 1570 nm in which the coupling efficiency is about 50%. That is happened because generally the extinction ratio of the MZI circuit become maximum when the coupling rate of the coupler is 50% and then the extinction ratio becomes deteriorated as the coupling ratio is away from the value of 50%. On the contrary, when the WINC shown in FIGS. 10A, 10B, 10C is used (in the case of the present exemplary embodiment), it is known that a high extinction ratio of 20 dB or more is obtained over wide band of 1520 nm to 1620 nm at any wavelength band.

It is noted that FIGS. 10A, 10B, 10C and FIGS. 11A, 11B, 11C show only outputs 1 and 2 (Pout 1 and Pout 2), however, similar extinction ratios are obtained with regard to outputs 3 and 4 (Pout 3 and Pout 4). Furthermore, a good characteristic, such as 0.2 GHz or less in entire C, L bands, is gained with regard to the polarization dependent frequency PDf and there is no deterioration caused by using the WINC. Furthermore, the insert loss is 6.7 dB or less in the entire C, L bands. The increase in loss, caused by using the WINC and expanding the evaluation wavelength band, is suppressed around 0.2 dB. As shown in the result above, it is confirmed that the wavelength band for use can be expanded by adapting the WINC as input couplers 6, 10 and output couplers 7, 11.

In each of the above-described exemplary embodiments, the optical path length L1 of the arm waveguide 9 is greater than the optical path length L2 of the arm waveguide 13, the first to fourth light output waveguides 21 to 24 have the same optical path length, and the length of the waveguide 15 is L1-L2 greater than that of the waveguide 14. However, the invention is not limited thereto. That is, the invention can be applied to a delay demodulation device in which the optical path length L1 of the arm waveguide 9 is greater than the optical path length L2 of the arm waveguide 13 and the sum of the optical path lengths of the waveguide 15 and the third and fourth light output waveguides 23 and 24 is L1-L2 greater than the sum of the optical path lengths of the waveguide 14 and the first and second light output waveguides 21 and 22.

In each of the above-described exemplary embodiments, the Y-branch waveguide is used as the optical splitter, but the invention is not limited thereto. Any coupler may be used as long as it can substantially equally divide input light. For example, various kinds of couplers, such as a directional coupler, a multi-mode interferometer coupler, and a wavelength-independent coupler using an MZI, may be used. Among them, it is preferable to use a coupler capable of obtaining the same branch ratio in a wide band.

In each of the above-described exemplary embodiments, when the DQPSK signal is propagated through the optical path of the first MZI 4 in the clockwise direction in the PLC chip 1B and the DQPSK signal is propagated through the optical path of the second MZI 5 in the counterclockwise direction in the PLC chip 1B, the PLC 1A may be reversed in the horizontal direction such that the input end (input port Pin) of the light input waveguide 2 is disposed in the vicinity of the right end of the end surface 1b of the PLC chip 1B.

In each of the above-described exemplary embodiments, the PLC-type delay demodulation circuit is provided, but the invention is not limited thereto. The invention can be applied to an optical interferometer including an optical splitter and a plurality of Mach-Zehnder interferometers.

Specifically, the invention is not limited to the PLC-type delay demodulation circuit, which is an optical demodulator that demodulates the DQPSK signals, but can also be applied to a PLC-type optical interferometer having the following structure.

An optical interferometer is formed on one PLC chip, and includes an optical splitter that branches an optical signal into two optical signals and first and second MZIs that delay the branched optical signals by a predetermined value so as to interfere with each other. Two arm waveguides of the first MZI and two arm waveguides of the second MZI are formed so as to overlap each other in the same region of the planar lightwave circuit. The optical paths of the first MZI and the second MZI are arranged such that the propagation directions of the optical signals are opposite to each other.

According to the PLC-type optical interferometer, it is possible to reduce the size of a PLC chip with respect to the arrangement of various kinds of light output waveguides. In particular, it is possible to meet the requirements that the output ends of the two MZIs are separated from each other with an arbitrary gap therebetween at the same end surface of the PLC chip, due to, for example, restrictions in the sizes of the light receiving elements or the sizes of components, such as lenses, when light components output from the two MZIs are directly coupled to the balanced receivers or when the light components are coupled very close to the PLC chip 1B by, for example, lenses, while reducing the size of the PLC chip.

As described above, an object of the invention is to provide a PLC-type delay demodulation circuit and a PLC-type optical interferometer capable of reducing the size of a PLC chip with respect to the arrangement of various light output waveguides.

In order to achieve the object, according to a first aspect of the invention, a PLC-type delay demodulation circuit includes a planar lightwave circuit that is formed on one PLC chip and demodulates a DQPSK-modulated optical signal. The PLC-type delay demodulation circuit includes: an optical splitter that branches the DQPSK-modulated optical signal into two optical signals; and first and second Mach-Zehnder Interferometers (MZIs) that delay the branched optical signals by one bit so as to interfere with each other. Two arm waveguides of the first MZI and two arm waveguides of the second MZI are formed so as to overlap each other in the same region of the planar lightwave circuit, and optical paths of the first MZI and the second MZI are arranged such that the propagation directions of the optical signals are opposite to each other.

According to this structure, it is possible to design a small PLC-type delay demodulation circuit with respect to the arrangement of various light output waveguides. In particular, this structure is very effective when the gap between the output ends of the two MZIs is large at the same end surface of the PLC chip due to restrictions in the arrangement of the balanced receivers and the chip size of the PLC-type delay demodulation device is increased for converting the gap between the light output waveguides.

The "MZI" means a Mach-Zehnder interferometer. In addition, the "propagation directions opposite to each other" means that, when the optical signal is propagated through the optical path of the first MZI in the clockwise direction in the PLC chip, the optical signal is propagated through the optical path of the second MZI in the counterclockwise direction in the PLC chip, and when the optical signal is propagated through the optical path of the first MZI in the counterclockwise direction in the PLC chip, the optical signal is propagated through the optical path of the second MZI in the clockwise direction in the PLC chip.

According to another aspect of the invention, in the PLC-type delay demodulation circuit, two output ends of the first MZI and two output ends of the second MZI may be arranged on both sides of the centers of the MZIs at the same end surface of the PLC chip.

According to this structure, it is possible to meet the requirements that the output ends of the two MZIs are arranged on both sides of the centers of the MZIs at the same end surface of the PLC chip with an arbitrary gap therebetween, while reducing the size of the PLC chip.

The "two output ends of the first MZI" are two output ports from which light intensity signals of an I component (I channel) obtained by delaying the DQPSK-modulated optical signals by one bit using the first MZI so as to interfere with each other are output. Similarly, the "two output ends of the first MZI" are two output ports from which light intensity signals of a Q component (Q channel) obtained by delaying the DQPSK-modulated optical signals by one bit using the second MZI so as to interfere with each other are output.

The "centers of the MZIs" means the centers of the arm waveguides of the first and second MZIs which are formed such that the two arm waveguides overlap each other in the same region of the planar lightwave circuit.

According to another aspect of the invention, in the PLC-type delay demodulation circuit, an optical path length L1 of a short arm waveguide of the first MZI may be different from an optical path length L2 of a short arm waveguide of the second MZI, and the length of an optical path from the optical splitter to the output end of the first MZI through the short arm waveguide of the first MZI may be equal to that of an optical path from the optical splitter to the output end of the second MZI through the short arm waveguide of the second MZI.

According to this structure, the flexibility of the design is improved, and it is possible to reduce the number of intersection points, as compared to the structure in which the short arm waveguide of the first MZI and the short arm waveguide of the second MZI have the same optical path length. Therefore, it is possible to reduce the size of the PLC-type delay demodulation circuit.

According to another aspect of the invention, in the PLC-type delay demodulation circuit, the planar lightwave circuit may further include two input waveguides that are branched from the optical splitter and are connected to input couplers of the first and second MZIs, first and second light output waveguides that extend from an output coupler of the first MZI to the output ends thereof, and third and fourth light output waveguides that extend from an output coupler of the second MZI to the output ends thereof. The first to fourth light output waveguides may have the same optical path length. The optical path length L1 of the short arm waveguide of the first MZI may be greater than the optical path length L2 of the short arm waveguide of the second MZI. One of the two input waveguides may be L1-L2 longer than the other input waveguide.

According to this structure, the flexibility of the design is improved, and it is possible to reduce the number of intersection points, as compared to the structure in which the short arm waveguide of the first MZI and the short arm waveguide of the second MZI have the same optical path length. Therefore, it is possible to reduce the size of the PLC-type delay demodulation circuit.

According to another aspect of the invention, in the PLC-type delay demodulation circuit, the other input waveguide may be a U-shaped waveguide, and the one input waveguide may be arranged so as to intersect the other input waveguide and the third and fourth light output waveguides.

According to this structure, it is possible to appropriately adjust the lengths of the two waveguides.

According to another aspect of the invention, in the PLC-type delay demodulation circuit, central portions of the two arm waveguides of the first MZI and central portions of the two arm waveguides of the second MZI may be arranged in a line.

According to this structure, even when the propagation directions of the first and second MZIs are opposite to each other, it is possible to arrange a wave plate in the central portions of the arm waveguides of the first and second MZIs and reduce the polarization dependence of the first and second MZIs under the same conditions.

According to another aspect of the invention, in the PLC-type delay demodulation circuit, a first half-wave plate having a main axis that is inclined at an angle of 45 degrees with respect to a refractive index main axis of the arm waveguides may be inserted in the central portions of the two arm waveguides of the first MZI and the central portions of the two arm waveguides of the second MZI so as to intersect all of the four arm waveguides.

According to this structure, it is possible to reduce a polarization dependent frequency PDf.

According to another aspect of the invention, in the PLC-type delay demodulation circuit, the two arm waveguides of the first MZI and the two arm waveguides of the second MZI may be formed in the same region of the planar lightwave circuit such that the short arm waveguide of the first MZI and a long arm waveguide of the second MZI intersect each other at four points.

According to this structure, the overall size of the planar lightwave circuit is reduced. In particular, the area of a portion including the two arm waveguides of the first MZI and the two arm waveguides of the second MZI is reduced, and it is possible to reduce the size of a PLC chip.

According to another aspect of the invention, in the PLC-type delay demodulation circuit, the two arm waveguides of the first MZI may extend in parallel so as to be close to each other in a portion in which the first half-wave plate is provided, and the two arm waveguides of the second MZI may extend in parallel so as to be close to each other in the portion in which the first half-wave plate is provided.

According to this structure, it is possible to reduce the influence of the positional dependence of the polarization conversion efficiency of the first half-wave plate at a position where the first half-wave plate intersects the two arm waveguides of the first MZI and the influence of the positional dependence of the polarization conversion efficiency of the first half-wave plate at a position where the first half-wave plate intersects the two arm waveguides of the second MZI.

According to another aspect of the invention, in the PLC-type delay demodulation circuit, all of the two arm waveguides of the first MZI and the two arm waveguides of the second MZI may extend in parallel so as to be close to each other in the portion in which the first half-wave plate is provided.

According to this structure, since the four arm waveguides extend in parallel so as to be close to each other in the portion in which the first half-wave plate is provided, all of the four arm waveguides pass through only a narrow region of the half-wave plate. Therefore, the PLC-type delay demodulation circuit is less likely to be affected by the positional dependence of the polarization conversion efficiency of the half-wave plate and it is easy to obtain good characteristics from the two MZIs.

According to another aspect of the invention, in the PLC-type delay demodulation circuit, the two arm waveguides of the first MZI and the two arm waveguides of the second MZI may be formed in the same region of the planar lightwave circuit such that the short arm waveguide of the first MZI and the long arm waveguide of the second MZI intersect each other at two points on both sides of the first half-wave plate. In the arrangement of the four arm waveguides in the wave plate insertion portion, one of the two arm waveguides of the second MZI may be arranged between the two arm waveguides of the first MZI.

According to this structure, it is possible to minimize the number of intersection points and reduce the gap between the four arm waveguides in the wave plate insertion portion.

According to another aspect of the invention, in the PLC-type delay demodulation circuit, each of the input couplers and the output couplers of the first and second MZIs may be a 3-dB coupler having two inputs and two outputs, and each of the two input waveguides may be connected to one of two input ends of the input couplers on the same side.

According to this structure, it is possible to use balanced receivers, which are pairs of the same light receiving elements, at the two output ends of the first MZI and the two output ends of the second MZI.

According to another aspect of the invention, in the PLC-type delay demodulation circuit, a second half-wave plate having a main axis that is parallel or horizontal to the refractive index main axis of the arm waveguides may be inserted at a position that deviates from the central portions of the two arm waveguides of the first MZI to an output side and a position that deviates from the central portions of the two arm waveguides of the second MZI to an input side.

According to this structure, even when polarization occurs in the coupler, the interference conditions of polarized light are the same as those of general non-polarized light and the polarization dependence of an interference circuit does not occur.

According to a second aspect of the invention, a PLC-type optical interferometer that is formed on one PLC chip includes; an optical splitter that branches an optical signal into two optical signals; and first and second Mach-Zehnder Interferometer (MZIs) that delay the branched optical signals by a predetermined value so as to interfere with each other. Two arm waveguides of the first MZI and two arm waveguides of the second MZI are formed so as to overlap each other in the same region of a planar lightwave circuit, and optical paths of the first MZI and the second MZI are arranged such that the propagation directions of the optical signals are opposite to each other.

According to the above-mentioned aspects of the invention, it is possible to reduce the size of a PLC chip with respect to the arrangement of various kinds of light output waveguides. In particular, it is possible to meet the requirements that the output ends of two MZIs are separated from each other with an arbitrary gap therebetween due to, for example, restrictions in the sizes of the light receiving elements or the sizes of components, such as lenses, when light components output from the two MZIs are directly coupled to the balanced receivers or when the light components are coupled very close to the PLC chip by, for example, lenses, while reducing the size of the PLC chip.

What is claimed is:

1. A Planar Lightwave Circuit (PLC)-type delay demodulation circuit including a planar lightwave circuit that is formed on one PLC chip and demodulates a Differential Quadrature Phase Shift Keying (DQPSK)-modulated optical signal, the PLC-type delay demodulation circuit comprising:
    an optical splitter that branches the DQPSK-modulated optical signal into two optical signals; and
    first and second Mach-Zehnder Interferometers (MZIs) that delay the branched optical signals by one bit so as to interfere with each other, wherein
    two arm waveguides of the first MZI and two arm waveguides of the second MZI are formed so as to overlap each other in the same region of the planar lightwave circuit,
    optical paths of the first MZI and the second MZI are arranged such that the propagation directions of the optical signals are opposite to each other,
    a first half-wave plate is positioned in central portions of the two arm waveguides of the first MZI and central portions of the two arm waveguides of the second MZI, and
    a second half-wave plate is positioned at a position that deviates from the central portions of the two arm waveguides of the first MZI and a position that deviates from the central portions of the two arm waveguides of the second MZI.

2. The PLC-type delay demodulation circuit according to claim 1, wherein two output ends of the first MZI and two output ends of the second MZI are arranged on both sides of the centers of the MZIs at the same end surface of the PLC chip.

3. The PLC-type delay demodulation circuit according to claim 1, wherein
    an optical path length L1 of a short arm waveguide of the first MZI is different from an optical path length L2 of a short arm waveguide of the second MZI, and
    the length of an optical path from the optical splitter to the output end of the first MZI through the short arm waveguide of the first MZI is equal to that of an optical path from the optical splitter to the output end of the second MZI through the short arm waveguide of the second MZI.

4. The PLC-type delay demodulation circuit according to claim 1, wherein
    the planar lightwave circuit further includes:
        two input waveguides that are branched from the optical splitter and are connected to input couplers of the first and second MZIs;
        first and second light output waveguides that extend from an output coupler of the first MZI to the output ends thereof; and third and fourth light output waveguides that extend from an output coupler of the second MZI to the output ends thereof, the first to fourth light output waveguides have the same optical path length, and the optical path length L1 of the short arm waveguide of the first MZI is greater than the optical path length L2 of the short arm waveguide of the second MZI, and one of the two input waveguides is L1-L2 longer than the other input waveguide.

5. The PLC-type delay demodulation circuit according to claim 4, wherein the other input waveguide is a U-shaped waveguide, and the one input waveguide is arranged so as to intersect the other input waveguide and the third and fourth light output waveguides.

6. The PLC-type delay demodulation circuit according to claim 4, wherein each of the input couplers and the output couplers of the first and second MZIs is a 3-dB coupler having two inputs and two outputs, and each of the two input waveguides is connected to one of two input ends of the input couplers on the same side.

7. The PLC-type delay demodulation circuit according to claim 4, wherein each of the input couplers and the output couplers of the first and second MZI is a Wavelength Insensitive Coupler.

8. The PLC-type delay demodulation circuit according to claim 1, wherein the central portions of the two arm waveguides of the first MZI and central portions of the two arm waveguides of the second MZI are arranged in a line.

9. The PLC-type delay demodulation circuit according to claim 1, wherein the first half-wave plate has a main axis that is inclined at an angle of 45 degrees with respect to a refractive index main axis of the arm waveguides and is inserted in the central portions of the two arm waveguides of the first MZI and the central portions of the two arm waveguides of the second MZI so as to intersect all of the four arm waveguides.

10. The PLC-type delay demodulation circuit according to claim 9, wherein the two arm waveguides of the first MZI extend in parallel so as to be close to each other in a portion in which the first half-wave plate is provided, and the two arm waveguides of the second MZI extend in parallel so as to be close to each other in the portion in which the first half-wave plate is provided.

11. The PLC-type delay demodulation circuit according to claim 1, wherein the two arm waveguides of the first MZI and the two arm waveguides of the second MZI are formed in the same region of the planar lightwave circuit such that the short arm waveguide of the first MZI and a long arm waveguide of the second MZI intersect each other at four points.

12. The PLC-type delay demodulation circuit according to claim 1, wherein all of the two arm waveguides of the first MZI and the two arm waveguides of the second MZI extend in parallel so as to be close to each other in the portion in which the first half-wave plate is provided.

13. The PLC-type delay demodulation circuit according to claim 12, wherein the two arm waveguides of the first MZI and the two arm waveguides of the second MZI are formed in the same region of the planar lightwave circuit such that the short arm waveguide of the first MZI and the long arm waveguide of the second MZI intersect each other at two points on both sides of the first half-wave plate, and in the arrangement of the four arm waveguides in the wave plate insertion portion, one of the two arm waveguides of the second MZI is arranged between the two arm waveguides of the first MZI.

14. The PLC-type delay demodulation circuit according to claim 1, wherein the second half-wave plate has a main axis that is parallel or horizontal to the refractive index main axis of the arm waveguides and is inserted at a position that deviates from the central portions of the two arm waveguides of the first MZI to an output side and a position that deviates from the central portions of the two arm waveguides of the second MZI to an input side.

15. An optical receiver comprising:

the PLC-type delay demodulation circuit according to claim 1 that receives a DQPSK-modulated optical signal and then outputs four light intensity signals;

a balanced receiver that receives the four light intensity signals outputted from the PLC-type delay demodulation circuit and then converts the four light intensity signals into electric signals; and an electric circuit that receives and decodes the electric signals outputted from the balanced receiver.

16. A Planar Lightwave Circuit (PLC)-type optical interferometer that is formed on one PLC chip, the PLC-type optical interferometer comprising;

an optical splitter that branches an optical signal into two optical signals; and first and second Mach-Zehnder Interferometers (MZIs) that delay the branched optical signals by a predetermined value so as to interfere with each other, wherein two arm waveguides of the first MZI and two arm waveguides of the second MZI are formed so as to overlap each other in the same region of a planar lightwave circuit, optical paths of the first MZI and the second MZI are arranged such that the propagation directions of the optical signals are opposite to each other, a first half-wave plate is positioned in central portions of the two arm waveguides of the first MZI and central portions of the two arm waveguides of the second MZI, and a second half-wave plate is positioned at a position that deviates from the central portions of the two arm waveguides of the first MZI and a position that deviates from the central portions of the two arm waveguides of the second MZI.

* * * * *